(12) United States Patent
Kron et al.

(10) Patent No.: US 11,460,865 B2
(45) Date of Patent: Oct. 4, 2022

(54) METHOD AND SYSTEM FOR LONGITUDINAL CONTROL OF AIRCRAFT

(71) Applicant: BOMBARDIER INC., Dorval (CA)

(72) Inventors: Aymeric Kron, Beaconsfield (CA); Matthew Olsthoorn, Pierrefonds (CA)

(73) Assignee: BOMBARDIER INC., Dorval (CA)

( * ) Notice: Subject to any disclaimer, the term of this patent is extended or adjusted under 35 U.S.C. 154(b) by 68 days.

(21) Appl. No.: 16/715,519

(22) Filed: Dec. 16, 2019

(65) Prior Publication Data
US 2020/0249700 A1 Aug. 6, 2020

Related U.S. Application Data

(60) Provisional application No. 62/782,701, filed on Dec. 20, 2018.

(51) Int. Cl.
| | |
|---|---|
| *G05D 1/08* | (2006.01) |
| *B64C 13/18* | (2006.01) |
| *B64C 13/50* | (2006.01) |
| *G05D 1/02* | (2020.01) |
| *G08G 5/00* | (2006.01) |

(52) U.S. Cl.
CPC ............ *G05D 1/085* (2013.01); *B64C 13/18* (2013.01); *B64C 13/503* (2013.01); *G05D 1/0202* (2013.01); *G08G 5/0021* (2013.01)

(58) Field of Classification Search
CPC .... G05D 1/085; G05D 1/0202; G05D 1/0607; G05D 1/101; B64C 13/18; B64C 13/503; B64C 13/16; B64C 39/10; B64C 2039/105; G08G 5/0021
See application file for complete search history.

(56) References Cited

U.S. PATENT DOCUMENTS

| | | | |
|---|---|---|---|
| 4,617,633 A | 10/1986 | McAllister | |
| 5,213,282 A * | 5/1993 | Gold | G05D 1/0061 |
| | | | 244/17.13 |
| 5,722,620 A | 3/1998 | Najmabadi et al. | |
| 6,062,513 A * | 5/2000 | Lambregts | G05D 1/0005 |
| | | | 244/175 |
| 9,296,474 B1 | 3/2016 | Nguyen et al. | |
| 10,890,463 B2 * | 1/2021 | Tremblay | G05D 1/0816 |
| 2009/0157239 A1 * | 6/2009 | Walton | B64C 13/16 |
| | | | 701/6 |

(Continued)

OTHER PUBLICATIONS

Julio Vital Diniz De Paula, Longitudinal Control Laws Based on C* Criterion, 19th International Congress of Mechanical Engineering, Nov. 5-9, 2007, pp. 1-10, ABCM, Brasilia, DF.

(Continued)

*Primary Examiner* — Donald J Wallace
(74) *Attorney, Agent, or Firm* — Norton Rose Fulbright Canada LLP

(57) ABSTRACT

Methods and systems for longitudinal control of aircraft during flight are disclosed. One method comprises receiving a commanded normal acceleration of the aircraft and computing a target pitch rate for the aircraft based on the commanded normal acceleration. The target pitch rate is used in a control technique for controlling one or more flight control surfaces of the aircraft to achieve the target pitch rate for the aircraft. The control technique can include (e.g., incremental) nonlinear dynamics inversion.

23 Claims, 7 Drawing Sheets

(56) References Cited

U.S. PATENT DOCUMENTS

2019/0286166 A1* 9/2019 De Lima .................. B64D 45/00
2019/0332124 A1* 10/2019 Irwin, III ............... B64C 13/506
2020/0183339 A1* 6/2020 Shi ........................ G06N 3/0454

OTHER PUBLICATIONS

F. Holzapfel et al., Development Of Control Laws For The Simulation Of A New Transport Aircraft, 25th International Congress of the Aeronautical Sciences, 2006, pp. 1-14, Germany.

F. Grondman et al., Design and Flight Testing of Incremental Nonlinear Dynamic Inversion based Control Laws for a Passenger Aircraft, AIAA SciTech Forum, Jan. 8-12, 2018, pp. 1-25, AIAA-2018-0385, American Institute of Aeronautics and Astronautics, Inc., USA.

I. Matamoros et al., Incremental Nonlinear Control Allocation for a Tailless Aircraft with Innovative Control effectors, AIAA SciTech Forum, Jan. 8-12, 2018, pp. 1-25, AIAA-2018-1116, American Institute of Aeronautics and Astronautics, Inc., USA.

R.C. Van't Veld et al., Stability and Robustness Analysis and Improvements for Incremental Nonlinear Dynamic Inversion Control, AIAA SciTech Forum, Jan. 8-12, 2018, pp. 1-17, AIAA-2018-1127, American Institute of Aeronautics and Astronautics, Inc., USA.

C. Cakiroglu et al., Robust Incremental Nonlinear Dynamic Inversion Control Using Angular Accelerometer Feedback, AIAA SciTech Forum, Jan. 8-12, 2018, pp. 1-16, AIAA-2018-1128, American Institute of Aeronautics and Astronautics, Inc., USA.

J. Harris et al., Direct L1-Adaptive Nonlinear Dynamic Inversion Control for Command Augmentation Systems, AIAA SciTech Forum, Jan. 8-12, 2018, pp. 1-19, AIAA-2018-1575, American Institute of Aeronautics and Astronautics, Inc., USA.

C.J. Miller, Nonlinear Dynamic Inversion Baseline Control Law: Architecture and Performance Predictions, GNC Conference, Aug. 8-11, 2011, NASA Dryden Flight Research Center, American Institute of Aeronautics and Astronautics, Inc., USA.

* cited by examiner

METHOD AND SYSTEM FOR LONGITUDINAL CONTROL OF AIRCRAFT

CROSS REFERENCE TO RELATED APPLICATION AND CLAIM OF PRIORITY

This application relies for priority on U.S. Provisional Patent Application Ser. No. 62/782,701 filed on Dec. 20, 2018, the entire content of which is incorporated herein by reference.

TECHNICAL FIELD

The disclosure relates generally to aircraft, and more particularly to longitudinal control of aircraft during flight.

BACKGROUND

Aircraft pilots rely on pitch rate and normal acceleration cues for longitudinal control. At lower velocities, normal acceleration cues are weak and the predominant cue is pitch rate. At higher velocities where slight pitching may produce a relatively large normal acceleration change, normal acceleration cues dominate. Thus, the ratio of pitch rate and normal acceleration varies according to natural variations in the aircraft's response. Based on this, a handling quality criterion comprising a blend of normal acceleration and pitch rate known as C* (pronounced C-star) can be used to evaluate the handling quality of the aircraft in a verification process and can also be tracked by a control law. In order to achieve the desired performance across the entire operating envelop of the aircraft, existing solutions include scheduling C* control loop gains as a function of several parameters such as altitude and aircraft speed. Scheduling and tuning these gains taking into account all flight conditions is a complex and tenuous task which is time consuming.

SUMMARY

In one aspect, the disclosure describes a method for longitudinal control of an aircraft during flight. The method comprises:

receiving a commanded normal acceleration of the aircraft;

computing a target pitch rate for the aircraft based on the commanded normal acceleration;

using the target pitch rate in a control technique for controlling one or more flight control surfaces of the aircraft; and controlling the one or more flight control surfaces of the aircraft using the control technique to achieve the target pitch rate for the aircraft.

The control technique may include incremental nonlinear dynamics inversion.

The control technique may include nonlinear dynamics inversion.

The method may comprise computing the target pitch rate using a feedforward controller.

The method may comprise computing the target pitch rate using a feedback controller.

Computing the target pitch rate may comprise: using a feedforward controller to compute a pitch rate feedforward command; using a feedback controller to compute a pitch rate feedback command; and summing the pitch rate feedforward command and the pitch rate feedback command to compute the target pitch rate.

The method may comprise:

computing a value of a handling quality criterion associated with the commanded normal acceleration of the aircraft, the handling quality criterion including a blend of normal acceleration and pitch rate of the aircraft as a function of a speed of the aircraft; and using the value of the handling quality criterion as a set point for the feedback controller.

The method may comprise using the commanded normal acceleration of the aircraft as a set point for the feedback controller.

The method may comprise: receiving a pitch acceleration of the aircraft; and using the pitch acceleration of the aircraft in the control technique.

The method may comprise: computing a pitch acceleration of the aircraft based on data acquired via one or more sensors; and using the pitch acceleration of the aircraft in the control technique.

The method may comprise: receiving a position of at least one of the flight control surfaces of the aircraft; and using the position of the at least one flight control surface in the control technique.

The commanded normal acceleration of the aircraft may be based on an input command originating from a pilot input device onboard the aircraft.

The commanded normal acceleration of the aircraft may be modified for speed stability.

The commanded normal acceleration of the aircraft may be modified for turn compensation.

Embodiments can include combinations of the above features.

In another aspect, the disclosure describes a system for longitudinal control of an aircraft during flight. The system comprises:

one or more computers operatively coupled to receive one or more signals indicative of a commanded normal acceleration of the aircraft, the one or more computers being configured to:

compute a target pitch rate for the aircraft based on the commanded normal acceleration;

use the target pitch rate in a control technique for controlling one or more flight control surfaces of the aircraft; and control the one or more flight control surfaces of the aircraft using the control technique to achieve the target pitch rate for the aircraft.

The control technique may include incremental nonlinear dynamics inversion.

The control technique may include nonlinear dynamics inversion.

The one or more computers may be configured to compute the target pitch rate using a feedforward controller.

The one or more computers may be configured to compute the target pitch rate using a feedback controller.

Computing the target pitch rate may comprise: using a feedforward controller to compute a pitch rate feedforward command; using a feedback controller to compute a pitch rate feedback command; and summing the pitch rate feedforward command and the pitch rate feedback command to compute the target pitch rate.

The one or more computers may be configured to:

compute a value of a handling quality criterion associated with the commanded normal acceleration of the aircraft, the handling quality criterion including a blend of normal acceleration and pitch rate of the aircraft as a function of a speed of the aircraft; and use the value of the handling quality criterion as a set point for the feedback controller.

The one or more computers may be configured to use the commanded normal acceleration of the aircraft as a set point for the feedback controller.

The one or more computers may be configured to: receive a pitch acceleration of the aircraft; and use the pitch acceleration of the aircraft in the control technique.

The one or more computers may be configured to: compute a pitch acceleration of the aircraft based on data acquired via one or more sensors; and use the pitch acceleration of the aircraft in the control technique.

The one or more computers may be configured to: receive a position of at least one of the flight control surfaces of the aircraft; and use the position of the at least one flight control surface in the control technique.

The commanded normal acceleration of the aircraft may be based on an input command originating from a pilot input device onboard the aircraft.

The commanded normal acceleration of the aircraft may be modified for speed stability.

The commanded normal acceleration of the aircraft may be modified for turn compensation.

Embodiments can include combinations of the above features.

In another aspect, the disclosure describes an aircraft comprising the system as described herein.

In another aspect, the disclosure describes a blended-wing-body aircraft comprising the system as described herein.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

Figure 1:
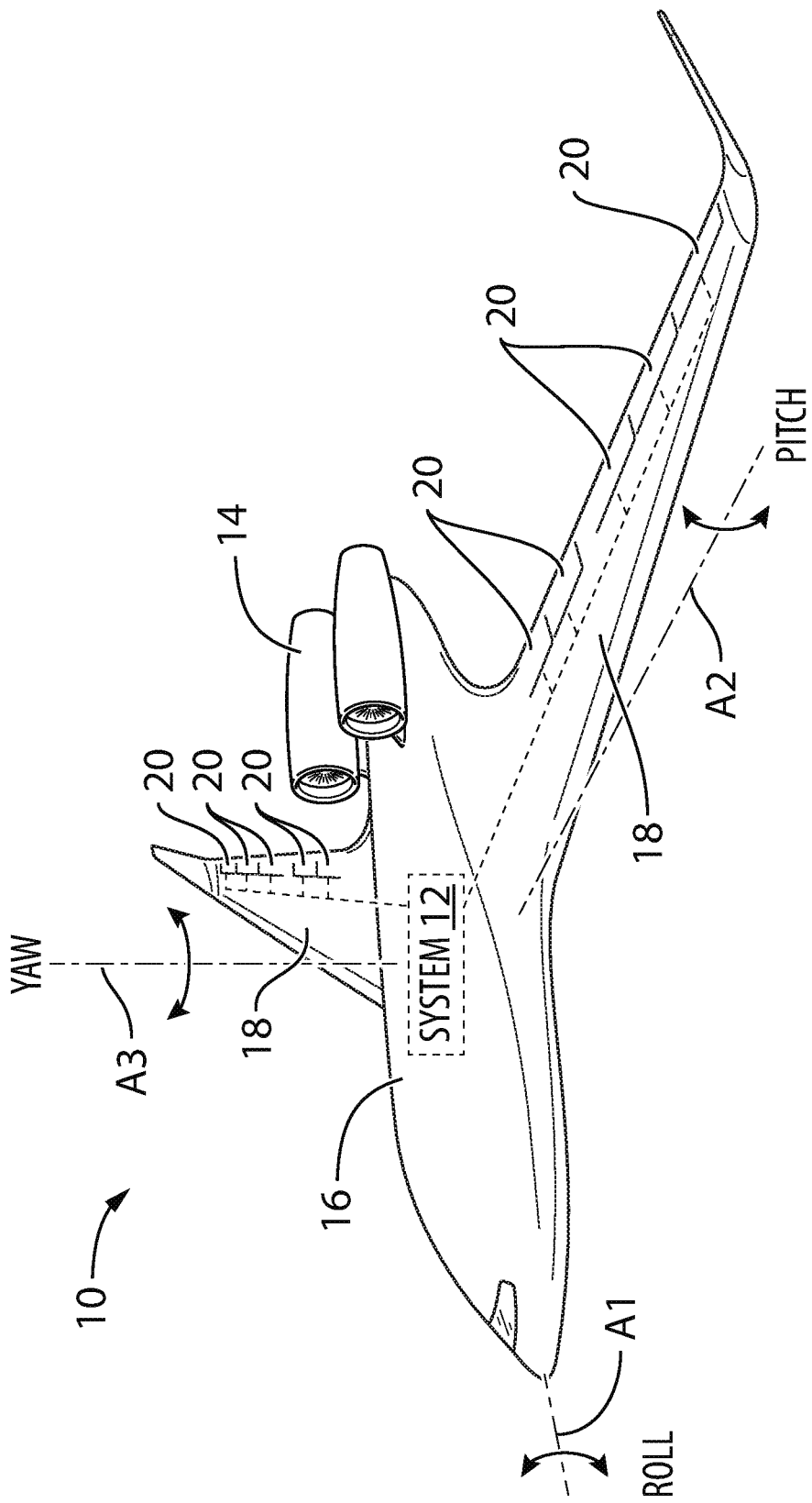
FIG. 1 is a perspective view of an exemplary aircraft comprising a system for longitudinal control of the aircraft during flight, as described herein.

In various embodiments, systems and methods described herein can facilitate the development of longitudinal control systems for aircraft and also improve robustness of such longitudinal control systems. The systems and methods described herein can allow for interconnecting a pilot's longitudinal control command with an incremental nonlinear dynamics inversion (INDI) or other control technique(s) for longitudinal control of an aircraft. For example, the systems and methods described herein can make use of control techniques based on a handling quality criterion (e.g., C*) in combination with an INDI control technique for longitudinal control of an aircraft. The use of INDI can significantly reduce the need for scheduling/tuning one or more controller gains over the entire operating envelope of the aircraft because the INDI control technique can absorb the variations of the flight dynamics over the operating envelop. Accordingly, the use of the handling quality criterion can be more consistent over the flight envelope (e.g., altitude, speed) and over the load envelope (e.g., mass, center of gravity (CG) location, inertia). In some embodiments, the systems and methods described herein can permit the benefits of using a handling quality criterion such as C* to be combined with the benefits of INDI or other control technique(s).

Aspects of the present disclosure can be used with various control techniques including, but not limited to, nonlinear dynamics inversion (NDI) and INDI. The term "(I)NDI" as referenced herein is intended to refer to either NDI or INDI. NDI is a known control technique that allows for the design of controllers for non-linear systems. NDI makes use of feedback linearization which allows a non-linear system to be controlled using linear control techniques. In the context of aircraft control systems, feedback linearization can require a relatively high-fidelity aerodynamic model of the aircraft to cancel the nonlinearities using state feedback and transformation. Accordingly, the performance of NDI controllers can depend on the accuracy of the aerodynamic models used. The sensitivity of NDI controllers can be remedied by reducing the dependency on such aerodynamic models through the use of INDI. This can be achieved by using angular acceleration feedback in an INDI control loop. INDI, sometimes called "Improved NDI" or "Modified NDI" is a control technique based on calculating the required incremental change in control input to steer the aircraft toward the desired state. INDI is based on the assumption that for small increments of time, a system's response to control inputs is larger than its response to changing states. This assumption allows the increment in control input to be calculated from the system's input-dependent dynamics only and disregarding the system's state-dependent dynamics.

The C* criterion is a handling quality criterion that takes into account a pilot's feel and can be incorporated in feedback C* controllers for longitudinal (i.e., pitch) control of aircraft. During flight, pilots respond to a blend of pitch rate and normal acceleration and the ratio can vary depending on the speed of the aircraft. At lower speeds, normal acceleration cues are weak and the predominant cue is pitch rate. At higher speeds where slight pitching may produce a large normal acceleration, normal acceleration cues dominate. Accordingly, the C* criterion is a dimensionless parameters that comprises a blend of normal acceleration and pitch rate. For example, the C* criterion can be expressed as $C^* = N_z + K_q Q$ where $N_z$ is the normal acceleration at the pilot's station or at a CG of the aircraft, Q is the pitch rate and $K_q$ is a blending gain.

Aspects of various embodiments are described through reference to the drawings.

FIG. 1 is a perspective view of an exemplary aircraft 10 which can comprise system 12 (shown schematically) for controlling some aspect(s) of operation of aircraft 10 during flight. Aircraft 10 can be any type of manned or unmanned aircraft (e.g., drones) such as corporate, private, commercial and passenger aircraft. For example, aircraft 10 can be a turboprop aircraft, a (e.g., ultra-long range) business jet or a narrow-body, twin-engine jet airliner. Aircraft 10 can be a fixed-wing aircraft comprising one or more engines 14. The exemplary aircraft 10 shown in FIG. 1 is a blended wing body (BWB) aircraft. The use of the systems and methods disclosed herein can be particularly advantageous for BWB aircraft that have nonlinear flight dynamics that can also vary based on changes in location of the CG during flight of such aircraft. However, it is understood that system 12 and the methods described herein are applicable to other types of aircraft as well.

In reference to FIG. 1, aircraft 10 can have center body 16 having a fore end at which a cockpit is located, and an opposed aft end. Center body 16 can be airfoil-shaped such as to be able to generate lift. In the embodiment shown, aircraft 10 is tailless. However, a tail structure may alternatively be provided at the aft end of center body 16 and/or a canard may be provided at the fore end of center body 16. Wings 18 project laterally from opposite sides of center body 16. Engine(s) 14 can be mounted to the aft end of the center body 16. Alternately or in addition, engine(s) 14 could be mounted to wings 18 or they could be fully or partially embedded within center body 16 or wings 18. BWB aircraft designs are sometimes also referred to as "hybrid wing body" aircraft designs. As referenced herein, terms "blended wing body" and "BWB" are intended to encompass designs referred to as "hybrid wing body" designs.

Aircraft 10 can include suitable flight control surfaces 20 configured to interact with air flowing around aircraft 10 during flight. Control system 12 can be operatively coupled to such flight control surfaces 20. Such flight control surfaces 20 can be movably mounted to wings 18 and/or other part(s) of aircraft 10 and can be configured to cause rotation of aircraft 10 about axes A1 (i.e., roll), A2 (i.e., pitch) and/or A3 (i.e., yaw) during flight. For example, one or more flight control surfaces 20 of aircraft 10 can be longitudinal control flight control surfaces (e.g., elevators, elevons) movably mounted to wings 18 in case of a BWB aircraft or to a horizontal stabilizer of an empennage in case of a traditional aircraft configuration. Such longitudinal control flight control surfaces can be considered primary flight control surfaces that cause aircraft 10 to move (i.e., rotate) about horizontal or lateral axis A2 during flight. In other words, movement of the longitudinal control flight control surfaces in flight can cause aircraft 10 to pitch up or down. Each longitudinal control flight control surface can be hinged to a trailing edge of wing 18 or of a horizontal stabilizer and be controllably movable.

The normal direction when referring to normal acceleration $N_z$ can be in relation to aircraft 10 and not necessarily vertical depending on the attitude of aircraft 10. The normal direction can be a vector in a symmetric plane of aircraft 10 and oriented toward the belly of aircraft 10 (i.e., perpendicular to a longitudinal axis A1 of aircraft 10). The normal direction can be parallel to yaw axis A3. Normal acceleration $N_z$ is sometimes referred to as "load factor" and can be used to define structural limits of the structure of aircraft 10.

Figure 2:
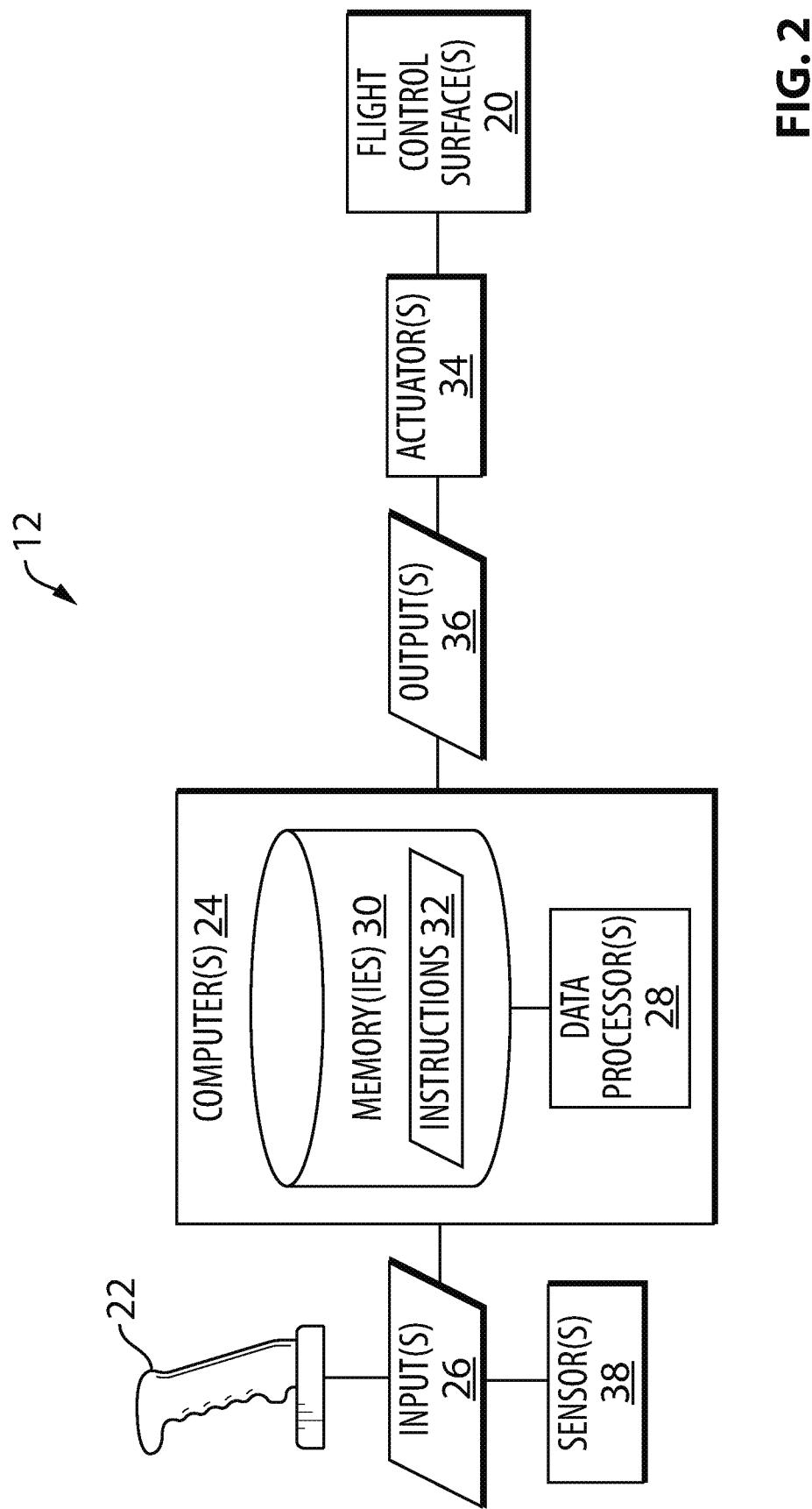
FIG. 2 is an exemplary schematic representation of the system for longitudinal control of the aircraft of FIG. 1.

FIG. 2 is an exemplary schematic representation of control system 12 of aircraft 10. Control system 12 can comprise one or more pilot input devices 22 (referred hereinafter in the singular) for receiving input from a pilot that is onboard aircraft 10. Such input can indicative of a desired longitudinal control (i.e., pitch) command that causes movement of one or more flight control surfaces 20 of aircraft 10. Control system 12 can comprise one or more computers 24 (referred hereinafter in the singular) operatively coupled to pilot input device 22 to receive input signals 26 indicative of the pilot's desired command(s). Pilot input device 22 can, for example, be a side stick, center stick or a control column and be configured to receive a desired pitch command from the pilot. In some embodiments, the systems and methods described herein can also be used with longitudinal control commands generated by an auto-flight (e.g., autopilot) system of aircraft 10, or with longitudinal control commands generated based on input from a pilot or other operator located remotely from aircraft 10. Accordingly, the systems and methods disclosed herein can be used for longitudinal control of manned or unmanned aircraft (e.g., drones).

Computer 24 can comprise one or more data processors 28 (referred hereinafter in the singular) and one or more non-transitory memories 30 (i.e., data storage devices) (referred hereinafter in the singular) including machine-readable instructions 32 executable by data processor 28. Instructions 32 can be configured to cause computer 24 to perform one or more steps so as to implement a computer-implemented process such that instructions 32, when executed by data processor 28 or other programmable apparatus, can cause the functions/acts specified in the methods described herein to be executed. Memory 30 can comprise any storage means (e.g. devices) suitable for retrievably storing machine-readable instructions 32 executable by data processor 28 of computer 24.

Various aspects of the present disclosure can be embodied as systems, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium(ia) (e.g., memory 30) having computer readable program code embodied thereon. The computer program product can, for example, be executed by computer 24 to cause the execution of one or more methods disclosed herein in entirety or in part. It is understood that, based on the present disclosure, one skilled in the relevant arts could readily write computer program code for implementing the methods disclosed herein.

Computer 24 can be directly or indirectly operatively coupled to actuators 34 (referred hereinafter in the singular) for controlling and optionally receiving feedback from actuator 34 associated with one or more flight control surfaces 20. For example, output signal(s) 36 (e.g., command signal(s)) provided by controller 24 could be used to control actuator 34. Computer 24 can be considered part of a fly-by-wire system of aircraft 10. For example, computer 24 can be configured to carry out additional functions than those described herein. In some embodiments, computer 24 can be of the type known as a flight control computer (FCC) of aircraft 10. Instructions 32 can be implemented in the form of control laws (CLAWS) in a FCC of aircraft 10. Input(s) 26 to computer 24 can also comprise signals indicative of (e.g., sensed or derived) operating parameters (i.e., states) of aircraft 10. Accordingly, computer 24 can be operatively connected to receive data acquired via one or more sensors 38.

Figure 3:
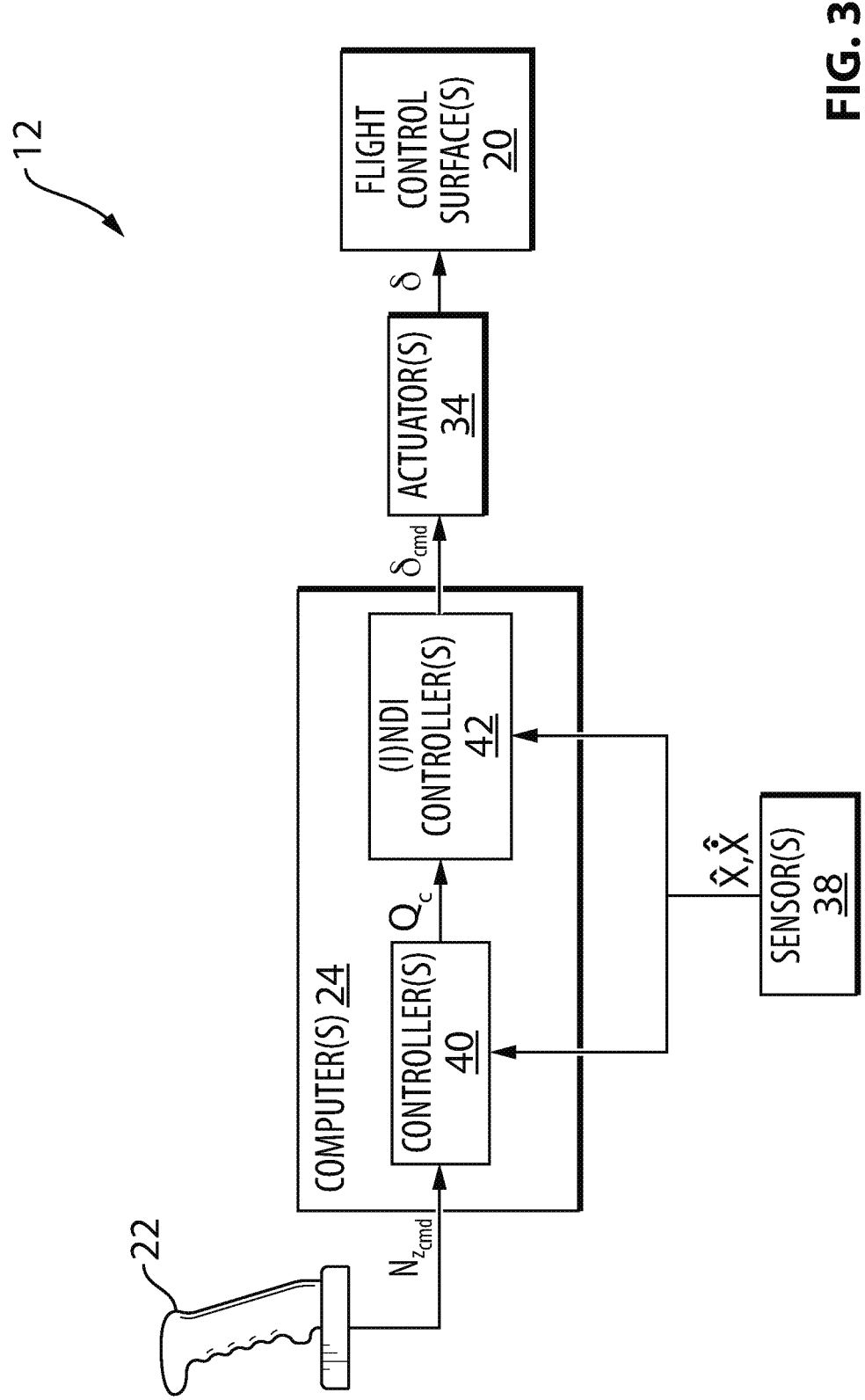
FIG. 3 is another exemplary schematic representation of the system of FIG. 2.

FIG. 3 is another exemplary schematic representation of system 12 of aircraft 10. System 12 can comprise one or more controllers 40 disposed upstream of one or more (I)NDI controllers 42 (or other type(s) of controller(s)). Controller(s) 40 and (I)NDI controller 42 can be implemented in separate computers and separate software, or their functionalities can be implemented in a common computer 24. Computer 24 can be operatively coupled to pilot input device 22 and to one or more flight control surfaces 20 via actuator(s) 34. Controller(s) 40 and (I)NDI controller(s) 42 can each comprise feedback and/or feedforward controllers.

During operation of system 12, input command $N_{Z_{cmd}}$ can be received from a human pilot via pilot input device 22, or input command $N_{Z_{cmd}}$ can be received from an auto-flight system of aircraft 10. Input command $N_{Z_{cmd}}$ can be indicative of a normal acceleration required to achieve a desired change in pitch (i.e., longitudinal control) of aircraft 10. Controller(s) 40 can compute, based on input command $N_{Z_{cmd}}$, a target pitch rate $Q_C$ for aircraft 10. (I)NDI controller 42 can be configured to then use target pitch rate $Q_C$ as an input (e.g., set point for a controlled variable) to an (I)NDI inner control loop or other control technique for controlling one or more flight control surfaces 20. In other word, system 12 can allow translating input command $N_{Z_{cmd}}$ in the form of a normal acceleration from an upstream process (pilot or autopilot) to a target pitch rate $Q_C$ for a downstream control technique such as (I)NDI.

System 12 can include one or more sensors 38 for providing input (e.g., feedback in the form of aircraft dynamics state variables $\hat{X}, \hat{\dot{X}}$) to outer loop controller(s) 40 and also to (I)NDI inner loop controller 42. Such input can be indicative of one or more operating parameters associated with aircraft 10. In some embodiments, sensor(s) 38 can include one or more angular accelerometers that can be used to acquire pitch acceleration, roll acceleration and/or yaw acceleration associated with aircraft 10. In some embodiments, sensor(s) 38 can include one or more position sensors for acquiring position(s) of one or more flight control surfaces 20. As explained above, in case of an INDI control technique being utilized in system 12, such feedback of pitch acceleration(s) and flight control surface position(s) can be used by (I)NDI controller 42 to compute one or more actuator commands $\delta_{cmd}$ representative of the required incremental change in position $\delta$ of the appropriate flight control surface(s) 20 in order to steer aircraft 10 toward the desired state requested by input command $N_{Z_{cmd}}$.

In some embodiments, instead of being acquired directly from a (e.g., acceleration) sensor, aircraft dynamics state variables $\hat{X}, \hat{\dot{X}}$ such as the pitch, roll and yaw accelerations, the pitch, roll and yaw positions, deflections of flight control surfaces 20 and other states can be derived/computed from other information available to computer 24. One or more of aircraft dynamics state variables $\hat{X}, \hat{\dot{X}}$ can be obtained through any onboard determination technique including direct measurement and/or state estimation. In some embodiments, one or more dynamics state variables $\hat{X}, \hat{\dot{X}}$ can be pseudo measurements. For example, suitable acceleration information can be computed based on one or more signals from a gyroscope. The pitch acceleration can then be used as feedback for an INDI control technique executed by (I)NDI controller 42. It is understood that for embodiments where the NDI control technique is used, a suitable aerodynamic onboard model of aircraft 10 would also be required.

Figure 4:
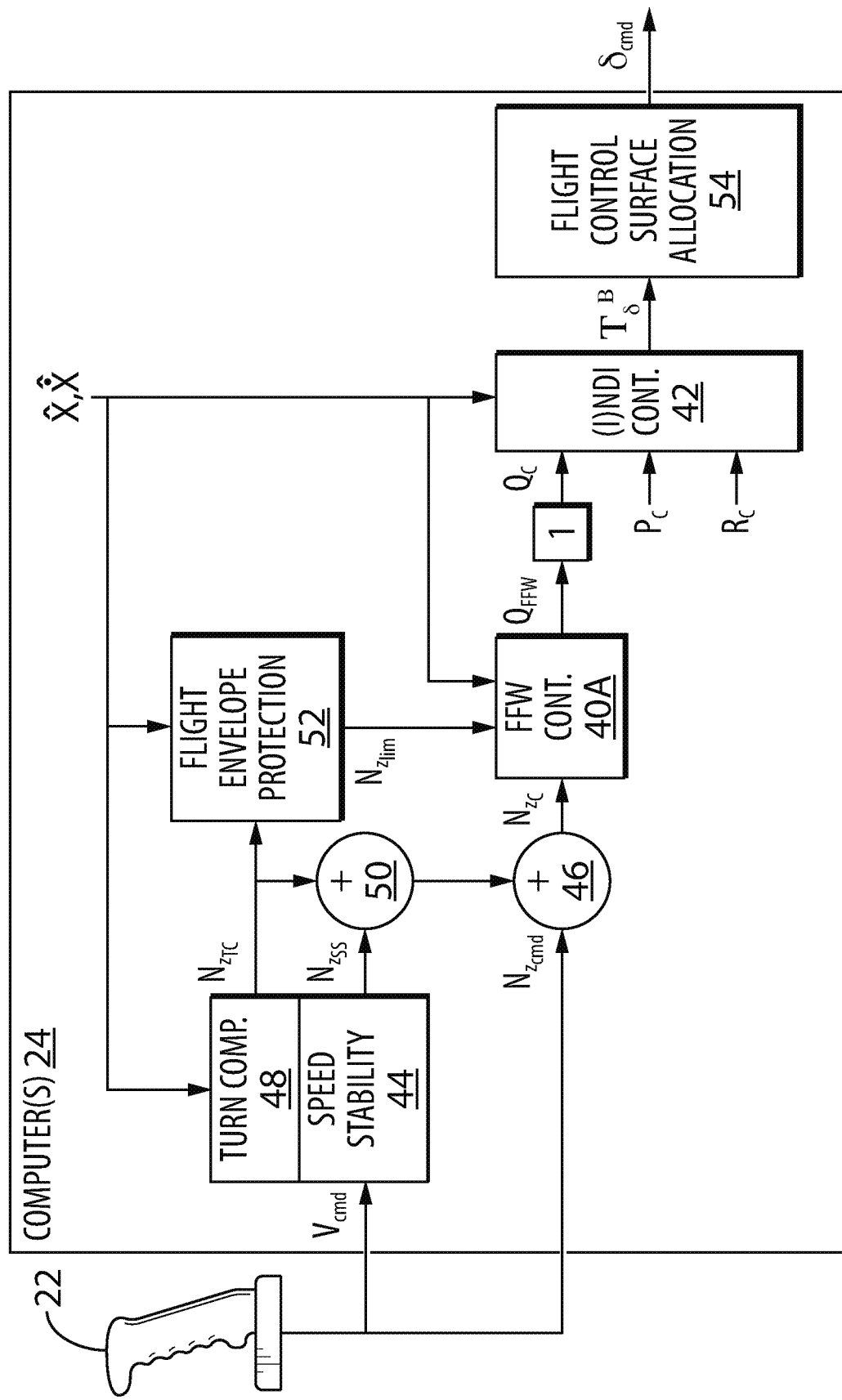
FIG. 4 is a schematic representation of an exemplary portion of the system of FIG. 3.

FIG. 4 is a schematic representation of an exemplary portion of system 12. In some embodiments, controller(s) 40 can comprise feedforward controller 40A. Pitch rate feedforward command $Q_{FFW}$ can be computed using suitable kinematic relationship(s) in a feedforward control technique that can be used to define pitch rate feedforward command $Q_{FFW}$ that is converted to target pitch rate $Q_C$ by a suitable gain so that target pitch rate $Q_C$ can then be tracked by (I)NDI controller 42. Such kinematic relationships can comprise equations representing a model of aircraft 10 which may not necessarily be accurately defined across the entire flight envelope especially when used in conjunction with an INDI control technique. Pitch rate feedforward command $Q_{FFW}$ can be computed based on a kinematic relationship between normal acceleration $N_Z$ and pitch rate Q which can be a function of the airspeed, pitch and roll angles, angle of attack and potentially other parameters of aircraft 10. Such kinematic relationship can depend on the type of aircraft 10 and be determined by analytic derivation of a kinematic relationship of a rigid body. The kinematic relationship or equation can be an approximation obtained by performing some simplifications.

Pitch rate feedforward command $Q_{FFW}$ can be computed based on a kinematic relationship (i.e., approximation) between normal acceleration $N_Z$ and pitch rate Q using equation 1 listed below as an example:

$$Q_{FFW} = \frac{g}{\hat{V}_T}\left[(\hat{N}_{cx} - \sin\hat{\theta})\sin\hat{\alpha} + (-N_{cz_{cmd}} - \cos\hat{\phi}\cos\hat{\theta})\cos\hat{\alpha}\right] \quad (1)$$

where $\hat{V}_T$ represents onboard knowledge of the true air speed of aircraft 10, $\hat{N}_{cx}$ represent onboard knowledge of a longitudinal component of a specific force at the CG of aircraft 10, $\hat{\phi}, \hat{\theta}$ represent onboard knowledge of the pitch and roll angles respectively, $\hat{\alpha}$ represents onboard knowledge of an angle of attack of aircraft 10, $N_{cz_{cmd}}$ represents a commanded normal component of the specific force at the CG of aircraft 10 and g represents the gravitational acceleration.

In some embodiments, input command $N_{Z_{cmd}}$ can correspond to commanded normal acceleration $N_{Z_C}$ that is provided to feedforward controller 40A for generating target pitch rate $Q_C$. Alternatively, commanded normal acceleration $N_{Z_C}$ can be a value that is computed based on $N_{Z_{cmd}}$ and one or more factors associated with the longitudinal control of aircraft 10. In some embodiments, commanded normal acceleration $N_{Z_C}$ can be a modification of input command $N_{Z_{cmd}}$ based on other control considerations. For example, system 12 can comprise a speed stability component/algorithm 44 which is optional. A neutrally stable airplane will not naturally return to its previous airspeed after a change in pitch attitude. However, speed stability component/algorithm 44 can implement a method that allows the pilot to set a reference airspeed by using a trim device. The speed stability component/algorithm 44 can produce term $N_{Z_{SS}}$ which can be combined with input command $N_{Z_{cmd}}$ at summer 46 to produce commanded normal acceleration $N_{Z_C}$, which takes into consideration speed stability. Speed stability term $N_{Z_{SS}}$ can be a commanded offset to the normal component of the specific force at the center of gravity of aircraft 10.

In some embodiments, system 12 can comprise turn compensation component/algorithm 48 which is optional. Turn compensation component/algorithm 48 can automatically apply a nose up bias (i.e., pitch compensation) to a nominal $N_{Z_{trim}}$ (e.g. $N_Z$=1 g for straight and level flight) to compensate for a loss of lift due to a roll angle when turning. Such compensation can ensure that aircraft 10 turns without loss of altitude. The turn compensation component/algorithm 48 can produce term $N_{Z_{TC}}$ which can be combined with input command $N_{Z_{cmd}}$ at summer 46 to produce commanded normal acceleration $N_{Z_C}$ which takes into consideration turn compensation. In some embodiments, system 12 can include one or both of speed stability and turn compensation components 44, 48. In reference to FIG. 4, Turn compensation term $N_{Z_{TC}}$ can be summed with $N_{Z_{SS}}$ summer 50 and the result of such sum can then be summed with $N_{Z_{cmd}}$ at summer 46 in order to produce commanded normal acceleration $N_{Z_C}$, which takes into consideration both speed stability and turn compensation.

System 12 can also comprise flight envelope protection component 52 which can comprise a software module that can prevent the pilot of aircraft 10 from making control commands (e.g., input command $N_{Z_{cmd}}$) that could cause aircraft 10 to exceed its structural and/or aerodynamic operating limits. For example flight envelope protection component 52 can supply a normal acceleration limit $N_{Z_{lim}}$ not to be exceeded that is computed based on one or more states $\hat{X}, \hat{\dot{X}}$ of aircraft 10 and that is supplied to feedforward controller 40A. Flight envelope protection component 52 can also include high angle of attack protection, pitch attitude protection and/or minimum trim speed protection.

System 12 can also comprise flight control surface allocation component 54 which can, based on (I)NDI output $T_\delta^B$, determine how to employ flight control surfaces to achieve the desired reaction from aircraft 10. For example, flight control surface allocation component 54 can receive (I)NDI output $T_\delta^B$ from (I)NDI controller 42 and identify which flight control surface(s) 20 to actuate and corresponding actuation amounts in order to achieve the desired reaction (e.g., desired normal acceleration $N_Z$ and/or change in pitch of aircraft 10).

In some embodiments, system 12 can also be configured to carry out control of aircraft 10 about one or more other axes of rotation. For example, system 12 can be used to control motion of aircraft 10 about axes A1 (i.e., roll) and A3 (i.e., yaw) in addition to axis A2 (i.e., pitch) during flight. Accordingly, (I)NDI controller 42 can be a multi-axis controller and be operatively coupled to receive target yaw rate $P_C$ and target roll rate $R_C$ and, via (I)NDI output $T_\delta^B$ and flight control surface allocation component 54, cause actuation of appropriate flight control surface(s) 20 to achieve the desired reaction (e.g., change in pitch, roll and/or yaw of aircraft 10). In some embodiments, longitudinal control of aircraft 10 can be coupled to other rotation axes of aircraft 10 so controller(s) 40 and (I)NDI controller 42 can take into consideration information associated with other axes in order to carry out functions associated with longitudinal control of aircraft 10.

Figure 5:
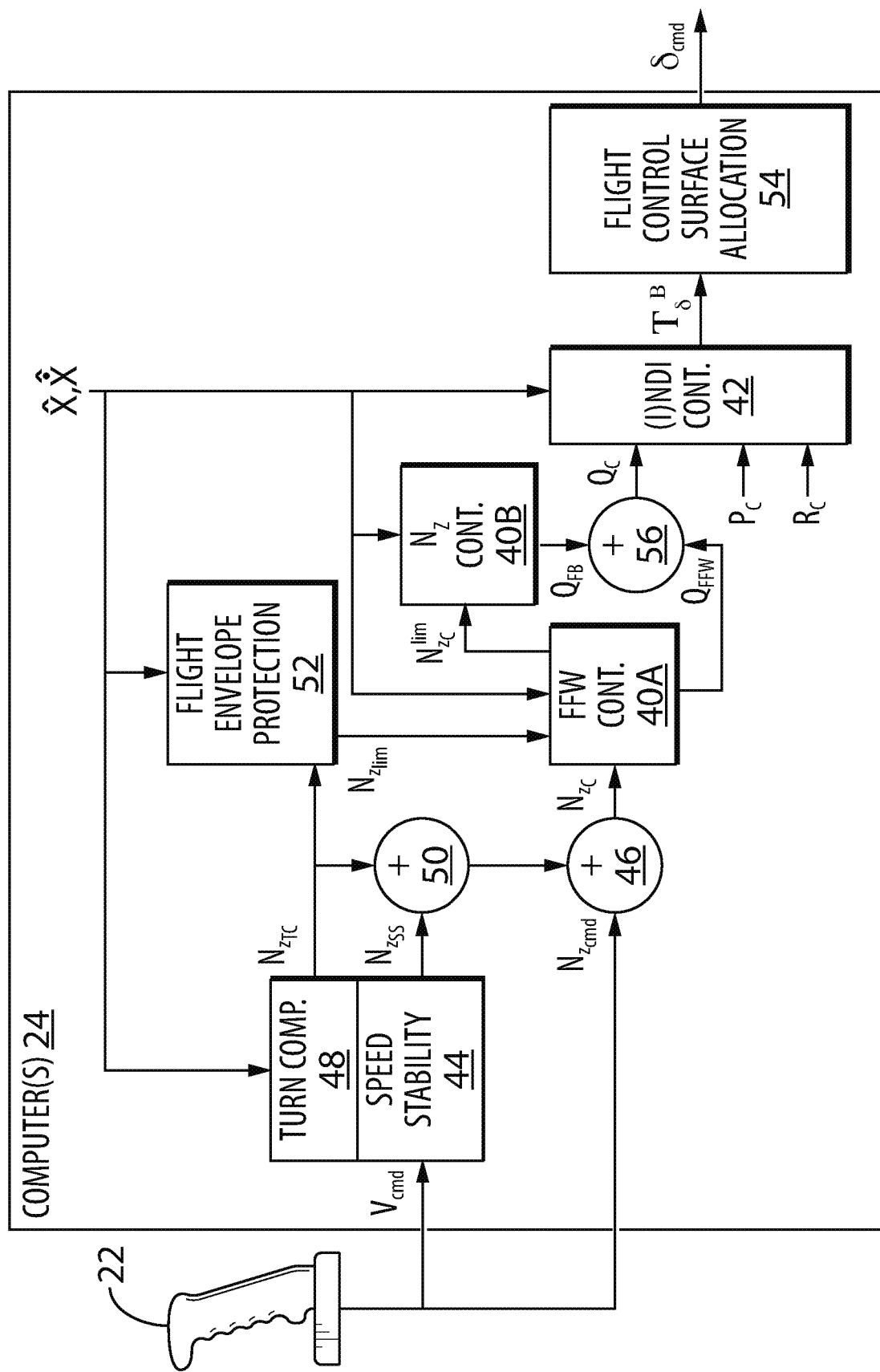
FIG. 5 is a schematic representation of another exemplary portion of the system of FIG. 3.

FIG. 5 is a schematic representation of another exemplary portion of system 12. In some embodiments, target pitch rate $Q_C$ can be computed using both feedforward controller 40A and feedback controller 40B. Feedforward controller 40A can compute pitch rate feedforward command $Q_{FFW}$ as described above in relation to FIG. 4. Feedback controller 40B can compute pitch rate feedback command $Q_{FB}$. Pitch rate feedforward command $Q_{FFW}$ and pitch rate feedback command $Q_{FB}$ can be summed at summer 56 to compute target pitch rate $Q_C$ that is provided to (I)NDI controller 42. In this embodiment, feedback controller 40B can implement a feedback control technique for which the set point corresponds to commanded normal acceleration $N_{Z_C}$, and feedback controller 40B takes into consideration the response of aircraft 10 to adjust pitch rate feedback command $Q_{FB}$ based on the set point. In some embodiments, the set point provided to feedback controller 40B can be limited by normal acceleration limit $N_{Z_{lim}}$ supplied by flight envelope protection component 52. The limited set point provided to feedback controller 40B is shown as $N_{Z_C}^{lim}$ in FIG. 5.

With system 12, the benefits of commanding an aircraft in normal acceleration $N_Z$ with INDI are combined, this allow using INDI with outer loop control techniques that take into account other control components such as speed stability, turn compensation and flight envelope protection. These control components do not have to be robust or tuned and scheduled as a function of the variations in the flight dynamics because INDI can absorb these variations.

Figure 6:
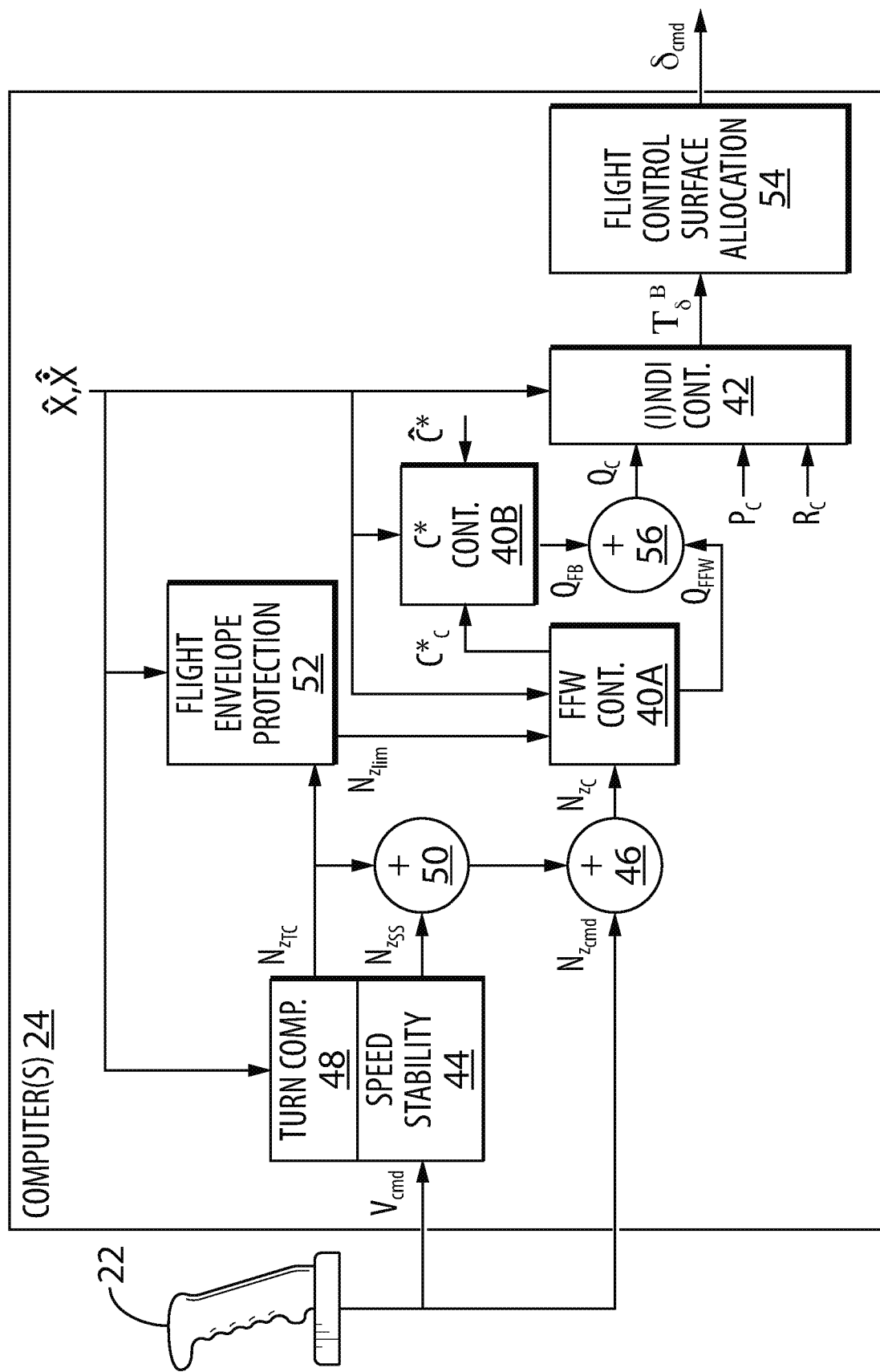
FIG. 6 is a schematic representation of another exemplary portion of the system of FIG. 3.

FIG. 6 is a schematic representation of another exemplary portion of system 12. In this embodiment, target pitch rate $Q_C$ can also be computed using both feedforward controller 40A and feedback controller 40B. Feedforward controller 40A can compute pitch rate feedforward command $Q_{FFW}$ as described above in relation to FIG. 4. Feedback controller 40B can compute pitch rate feedback command $Q_{FB}$. Pitch rate feedforward command $Q_{FFW}$ and pitch rate feedback command $Q_{FB}$ can be summed at summer 56 to compute target pitch rate $Q_C$ that is provided to (I)NDI controller 42. In this embodiment, feedback controller 40B can implement a feedback control technique for which the set point corresponds to a commanded $C_C^*$ value and feedback controller 40B takes into consideration the response of aircraft 10 to adjust pitch rate feedback command $Q_{FB}$ based on the set point.

Instead of commanding one or more flight control surfaces 20 directly from a commanded C* value $C_C^*$, feedback controller 40B can be used, optionally together with feedforward controller 40A, to compute target pitch rate $Q_C$ which is used as a set point for (I)NDI controller 42 (e.g., in an INDI control loop). Target pitch rate $Q_C$ can be computed based on a commanded C* value $C_C^*$ that is computed from commanded normal acceleration $N_{Z_C}$. Feedback controller 40B can implement a feedback control for which the input is the error between a commanded C* value $C_C^*$ and a pseudo measurement (i.e., onboard knowledge) of C*, referenced in FIG. 6 and below as $\hat{C}^*$, computed from a measured normal acceleration $\hat{N}_Z$ and a measured pitch rate $\hat{Q}$. Pitch rate feedback command $Q_{FB}$ can be computed using equation 2 provided as an example below:

$$Q_{FB} = K_{C^*}(s)(C_C^* - \hat{C}^*) \quad (2)$$

where $C_C^* = K_{nz}N_{Z_{cmd}} + K_q Q_{FFW}$ with $N_{Z_{cmd}} = -N_{CZ_{cmd}}$, $\hat{C}^* = K_{nz}\hat{N}_z + K_q Q$ with $\hat{N}_z = -\hat{N}_{cz}$, $K_{C^*}(s)$ represents a proportional-integral (PI) controller gain, $N_{CZ_{cmd}}$ represents a commanded normal component of the specific force at the location of the CG of aircraft 10, $\hat{N}_{cz}$ represents onboard knowledge of the normal component of the specific force at the location of the CG of aircraft 10, and where $K_{nz}$ and $K_q$ are gains.

With system 12, the benefits of using C*-based longitudinal control can be retained and be combined with INDI, which can absorb the variations across the operating envelope. Accordingly, various control gains upstream of INDI controller 42, including C* feedback/feedforward gains, do not require scheduling across the entire operating envelope. The use of speed stability component/algorithm 44, can permit feedback controller 40B to make use of a criterion sometimes referred to as "C*U" that combines a desirable pitch response using C* with long term speed stability.

It is understood that feedback controller 40B could track a variable other than normal acceleration $N_Z$ or C* in some embodiments.

Figure 7:
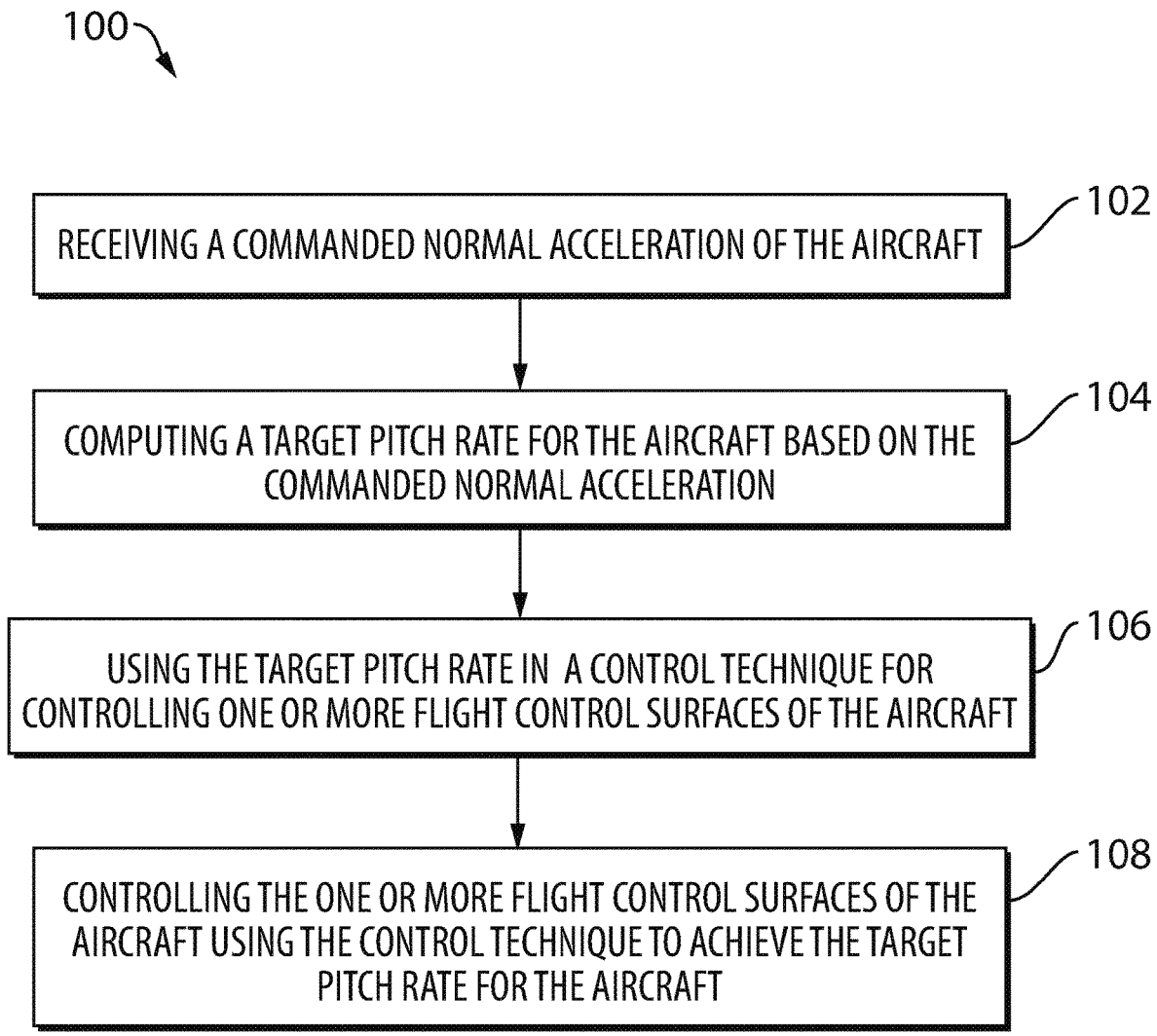
FIG. 7 is a flowchart illustrating a method for longitudinal control of an aircraft during flight.

FIG. 7 is a flowchart illustrating method 100 for longitudinal control of an aircraft during flight. Method 100 can be performed using system 12 described herein or using other systems. For example, machine-readable instructions 32 (see FIG. 2) can be configured to cause computer 24 to perform at least part of method 100. It is understood that aspects of method 100 can be combined with aspects of other methods described herein. In various embodiments, method 100 can comprise:

receiving commanded normal acceleration (e.g., $N_{Z_C}$) of aircraft 10 (see block 102);

computing a target pitch rate $Q_C$ for aircraft 10 based on commanded normal acceleration $N_{Z_C}$ (see block 104);

using the target pitch rate $Q_C$ in a control technique for controlling one or more flight control surfaces 20 of aircraft 10 (see block 106); and controlling the one or more flight control surfaces 20 of aircraft 10 using the control technique to achieve target pitch rate $Q_C$ for aircraft 10 (see block 108).

In some embodiments of method 100, the control technique can include INDI. In some embodiments of method 100, the control technique can include NDI.

Method 100 can comprise computing target pitch rate $Q_C$ using feedforward controller 40A.

Method 100 can comprise computing target pitch rate $Q_C$ using feedback controller 40B.

Method 100 can comprise: using feedforward controller 40A to compute pitch rate feedforward command $Q_{FFW}$; using feedback controller 40B to compute pitch rate feedback command $Q_{FB}$; and summing pitch rate feedforward command $Q_{FFW}$ and pitch rate feedback command $Q_{FB}$ to compute target pitch rate $Q_C$ (i.e., $Q_{FFW}+Q_{FB}=Q_C$).

Method 100 can comprise using the commanded normal acceleration $N_{Z_C}$ of aircraft 10 as a set point for feedback controller 40B.

Method 100 can comprise computing a value of a handling quality criterion (e.g., $C_C^*$) associated with the commanded normal acceleration $N_{Z_C}$ of aircraft 10. The value of the handling quality criterion $C_C^*$ can including a blend of normal acceleration $N_Z$ and pitch rate Q of aircraft 10 as a function of a speed of aircraft 10. The value of the handling quality criterion $C_C^*$ can be used as the set point for feedback controller 40B.

Method 100 can comprise receiving a pitch acceleration of aircraft 10 and using the pitch acceleration of aircraft 10 in the control technique.

Method 100 can comprise computing the pitch acceleration of aircraft 10 based on data acquired via one or more sensors and using the pitch acceleration of the aircraft in the control technique.

Method 100 can comprise receiving a position of at least one of flight control surfaces 20 of aircraft 10 and using the position of the at least one flight control surface 20 in the control technique.

In various embodiments, commanded normal acceleration $N_{Z_C}$ of aircraft 10 can be based on an input command $N_{Z_{cmd}}$ received from a pilot onboard the aircraft via input device 22. Alternatively or in addition, commanded normal acceleration $N_{Z_C}$ of aircraft 10 can be based on an input command $N_{Z_{cmd}}$ received from an auto-flight device associated (e.g., onboard or remote from) aircraft 10.

In some embodiments, commanded normal acceleration $N_{Z_C}$ of aircraft 10 can be modified for speed stability (e.g., via speed stability term $N_{Z_{SS}}$).

In some embodiments, commanded normal acceleration $N_{Z_C}$ of aircraft 10 can be modified for turn compensation (e.g., via turn compensation term $N_{Z_{TC}}$).

The use of $N_Z$ and/or C* in combination with INDI can, in some embodiments, result in increased robustness to non-linear dynamics variations and can improve performance consistency across the operating envelope of aircraft 10. A numerical model of aircraft 10 that is accurate across the entire flight envelope can be relative complex and dependent on several variables such as altitude, speed, payload, fuel quantity and distribution, CG location, inertia, weather conditions (e.g., whether ice has formed on wings 18), angle of attack . . . etc. Such numerical model can comprise one or more non-linear dynamics equations and can be difficult and time-consuming to define. In some embodiments of systems and methods described herein, the use of INDI can significantly reduce the reliance on such numerical model as explained herein.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for longitudinal control of an aircraft during flight, the method comprising:
   receiving a commanded normal acceleration of the aircraft;
   computing a target pitch rate for the aircraft based on the commanded normal acceleration;
   using the target pitch rate in a control technique for controlling one or more flight control surfaces of the aircraft; and
   controlling the one or more flight control surfaces of the aircraft using the control technique to achieve the target pitch rate for the aircraft;
   wherein the method also includes:
      computing the target pitch rate using a feedback controller;
      computing a value of a handling quality criterion associated with the commanded normal acceleration of the aircraft, the handling quality criterion including a blend of normal acceleration and pitch rate of the aircraft as a function of a speed of the aircraft; and
      using the value of the handling quality criterion as a set point for the feedback controller; and
   wherein the handling quality criterion generates, at a first aircraft speed, a weak normal acceleration cue and a predominant pitch rate cue, and, at a second aircraft speed higher than the first aircraft speed, a weak pitch rate cue and a predominant normal acceleration cue.

2. The method as defined in claim 1, wherein the control technique includes incremental nonlinear dynamics inversion.

3. The method as defined in claim 1, wherein the control technique includes nonlinear dynamics inversion.

4. The method as defined in claim 1, comprising computing the target pitch rate using a feedforward controller.

5. The method as defined in claim 1, wherein computing the target pitch rate comprises:
   using a feedforward controller to compute a pitch rate feedforward command;
   using the feedback controller to compute a pitch rate feedback command; and
   summing the pitch rate feedforward command and the pitch rate feedback command to compute the target pitch rate.

6. The method as defined in claim 1, comprising:
receiving a pitch acceleration of the aircraft; and
using the pitch acceleration of the aircraft in the control technique.

7. The method as defined in claim 1, comprising:
computing a pitch acceleration of the aircraft based on data acquired via one or more sensors; and
using the pitch acceleration of the aircraft in the control technique.

8. The method as defined in claim 1, comprising:
receiving a position of at least one of the flight control surfaces of the aircraft; and
using the position of the at least one flight control surface in the control technique.

9. The method as defined in claim 1, wherein the commanded normal acceleration of the aircraft is based on an input command originating from a pilot input device onboard the aircraft.

10. The method as defined in claim 1, wherein the commanded normal acceleration of the aircraft is modified for speed stability.

11. The method as defined in claim 1, wherein the commanded normal acceleration of the aircraft is modified for turn compensation.

12. A system for longitudinal control of an aircraft during flight, the system comprising:
one or more computers operatively coupled to receive one or more signals indicative of a commanded normal acceleration of the aircraft, the one or more computers being configured to:
compute a target pitch rate for the aircraft based on the commanded normal acceleration;
use the target pitch rate in a control technique for controlling one or more flight control surfaces of the aircraft; and
control the one or more flight control surfaces of the aircraft using the control technique to achieve the target pitch rate for the aircraft;
wherein the one or more computers are also configured to:
compute the target pitch rate using a feedback controller;
compute a value of a handling quality criterion associated with the commanded normal acceleration of the aircraft, the handling quality criterion including a blend of normal acceleration and pitch rate of the aircraft as a function of a speed of the aircraft; and
use the value of the handling quality criterion as a set point for the feedback controller; and
wherein the handling quality criterion generates, at a first aircraft speed, a weak normal acceleration cue and a predominant pitch rate cue, and, at a second aircraft speed higher than the first aircraft speed, a weak pitch rate cue and a predominant normal acceleration cue.

13. The system as defined in claim 12, wherein the control technique includes incremental nonlinear dynamics inversion.

14. The system as defined in claim 12, wherein the control technique includes nonlinear dynamics inversion.

15. The system as defined in claim 12, wherein the one or more computers are configured to compute the target pitch rate using a feedforward controller.

16. The system as defined in claim 12, wherein computing the target pitch rate comprises:
using a feedforward controller to compute a pitch rate feedforward command;
using the feedback controller to compute a pitch rate feedback command; and
summing the pitch rate feedforward command and the pitch rate feedback command to compute the target pitch rate.

17. The system as defined in claim 12, wherein the one or more computers are configured to:
receive a pitch acceleration of the aircraft; and
use the pitch acceleration of the aircraft in the control technique.

18. The system as defined in claim 12, wherein the one or more computers are configured to:
compute a pitch acceleration of the aircraft based on data acquired via one or more sensors; and
use the pitch acceleration of the aircraft in the control technique.

19. The system as defined in claim 12, wherein the one or more computers are configured to:
receive a position of at least one of the flight control surfaces of the aircraft; and
use the position of the at least one flight control surface in the control technique.

20. The system as defined in claim 12, wherein the commanded normal acceleration of the aircraft is based on an input command originating from a pilot input device onboard the aircraft.

21. The system as defined in claim 12, wherein the commanded normal acceleration of the aircraft is modified for speed stability.

22. The system as defined in claim 12, wherein the commanded normal acceleration of the aircraft is modified for turn compensation.

23. An aircraft comprising the system as defined in claim 12.

* * * * *